US012719190B2

(12) United States Patent
Oguri et al.

(10) Patent No.: US 12,719,190 B2
(45) Date of Patent: Aug. 25, 2026

(54) CONNECTOR WITH HOUSING HAVING OFFSET TERMINAL PROTRUDING SURFACE

(71) Applicant: SUMITOMO WIRING SYSTEMS, LTD., Mie (JP)

(72) Inventors: Taiga Oguri, Mie (JP); Koyo Takasaki, Mie (JP); Yuichi Nakanishi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 325 days.

(21) Appl. No.: 18/413,324

(22) Filed: Jan. 16, 2024

(65) Prior Publication Data

US 2024/0258727 A1 Aug. 1, 2024

(30) Foreign Application Priority Data

Jan. 30, 2023 (JP) ................................ 2023-012058

(51) Int. Cl.
*H01R 12/71* (2011.01)
*H01R 12/70* (2011.01)
*H01R 13/405* (2006.01)

(52) U.S. Cl.
CPC ......... *H01R 12/716* (2013.01); *H01R 12/707* (2013.01); *H01R 13/405* (2013.01)

(58) Field of Classification Search
CPC .. H01R 12/716; H01R 12/707; H01R 13/405; H01R 13/6271; H01R 43/0256; H01R 12/724; H01R 13/502; H01R 13/02; H01R 13/40; H01R 4/028; H01R 13/41
See application file for complete search history.

(56) References Cited

U.S. PATENT DOCUMENTS 4,491,376 A * 1/1985 Gladd .................. H01R 12/724 439/79
4,690,479 A * 9/1987 Hollyday ........... H01R 13/7195 439/97
5,688,129 A * 11/1997 Flaherty ............... H01R 12/716 439/79

(Continued)

FOREIGN PATENT DOCUMENTS

JP 2010-238508 A 10/2010
JP 2012-243676 A 12/2012

(Continued)

*Primary Examiner* — Edwin A. Leon
(74) *Attorney, Agent, or Firm* — Venjuris, P.C.

(57) ABSTRACT

A housing has a tubular shape that is open forward, and includes a bottom wall to be placed on a circuit substrate, a ceiling wall opposing the bottom wall, and a back wall that links a rear end portion of the bottom wall to a rear end portion of the ceiling wall in the up-down direction. Each terminal fitting is shaped so as to pass through the back wall in the front-rear direction, and includes a terminal connection portion disposed inside the housing, and a substrate connection portion disposed outside the housing. The ceiling wall has a larger volume than the bottom wall and is overall thicker than the bottom wall in the up-down direction, and a terminal protruding surface, from which the substrate connection portion protrudes, on a rear surface of the back wall is disposed forward of a rear surface of the ceiling wall.

8 Claims, 7 Drawing Sheets

(56) References Cited

U.S. PATENT DOCUMENTS

| | | | | | |
|---|---|---|---|---|---|
| 5,921,789 | A * | 7/1999 | Makino | H01R 12/716 439/590 |
| 6,808,397 | B2 * | 10/2004 | Kondo | H01R 12/7047 439/82 |
| 7,841,869 | B2 * | 11/2010 | Yamaguchi | H05K 7/026 439/589 |
| 2005/0124228 | A1 | 6/2005 | Nakano et al. | |

FOREIGN PATENT DOCUMENTS

| | | | |
|---|---|---|---|
| JP | 2015-210936 | A | 11/2015 |
| JP | 2021-114378 | A | 8/2021 |

* cited by examiner

CONNECTOR WITH HOUSING HAVING OFFSET TERMINAL PROTRUDING SURFACE

CROSS-REFERENCE TO RELATED APPLICATIONS

This application is based on and claims priority from Japanese Patent Application No. 2023-012058, filed on Jan. 30, 2023, with the Japan Patent Office, the disclosure of which is incorporated herein in its entirety by reference.

TECHNICAL FIELD

The present disclosure relates to a connector.

BACKGROUND

A connector disclosed in JP 2005-166492 A is a substrate connector that is mounted on a circuit substrate, and includes terminal fittings and a resin housing (connector housing) to which the terminal fittings are attached. The housing has a tubular shape that is open forward, and includes, in a rear end portion thereof, a back wall (terminal holding portion) shaped so as to stand upright from a surface of the circuit substrate. The terminal fittings pass through the back wall, and each include a terminal connection portion (connector-side connection portion) disposed inside the housing and a substrate connection portion (substrate-side connection portion) disposed outside the housing. A rear end portion of the substrate connection portion extends along the surface of the circuit substrate, and is connected to a conductive portion (conductive path) of the circuit substrate through soldering. This type of substrate connector is also disclosed in JP 2010-238508 A, JP 2012-243676 A, JP 2015-210936 A, and JP 2021-114378 A.

SUMMARY

In a connector such as those described above, substrate connection portions of terminal fittings are subjected to a reflow process and are connected to a conductive portion of a circuit substrate through soldering. In this case, the connector may deform due to heat generated in the reflow process, such that the housing and the circuit substrate are warped. There is a difference in the thermal expansion rate between the housing and the circuit substrate, and thus, there is a concern that, when the housing is warped, the substrate connection portions of the terminal fittings will rise away from the conductive portion of the circuit substrate, thus leading to a decrease in the connection reliability.

In view of this, an object of the present disclosure is to provide a connector that can suppress warping of a housing.

A connector according to the present disclosure includes: a terminal fitting and a resin housing to which the terminal fitting is attached, the housing having a tubular shape that is open forward, and including a bottom wall to be placed on a circuit substrate, a ceiling wall opposing the bottom wall, and a back wall linking a rear end portion of the bottom wall to a rear end portion of the ceiling wall in an up-down direction, the terminal fitting being shaped so as to pass through the back wall in a front-rear direction, and including a terminal connection portion disposed inside the housing, and a substrate connection portion disposed outside the housing, the ceiling wall having a larger volume than the bottom wall and being overall thicker than the bottom wall in the up-down direction, and a terminal protruding surface, from which the substrate connection portion protrudes, on a rear surface of the back wall being disposed forward of a rear surface of the ceiling wall.

According to the present disclosure, it is possible to provide a connector that can suppress warping of a housing of the connector.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
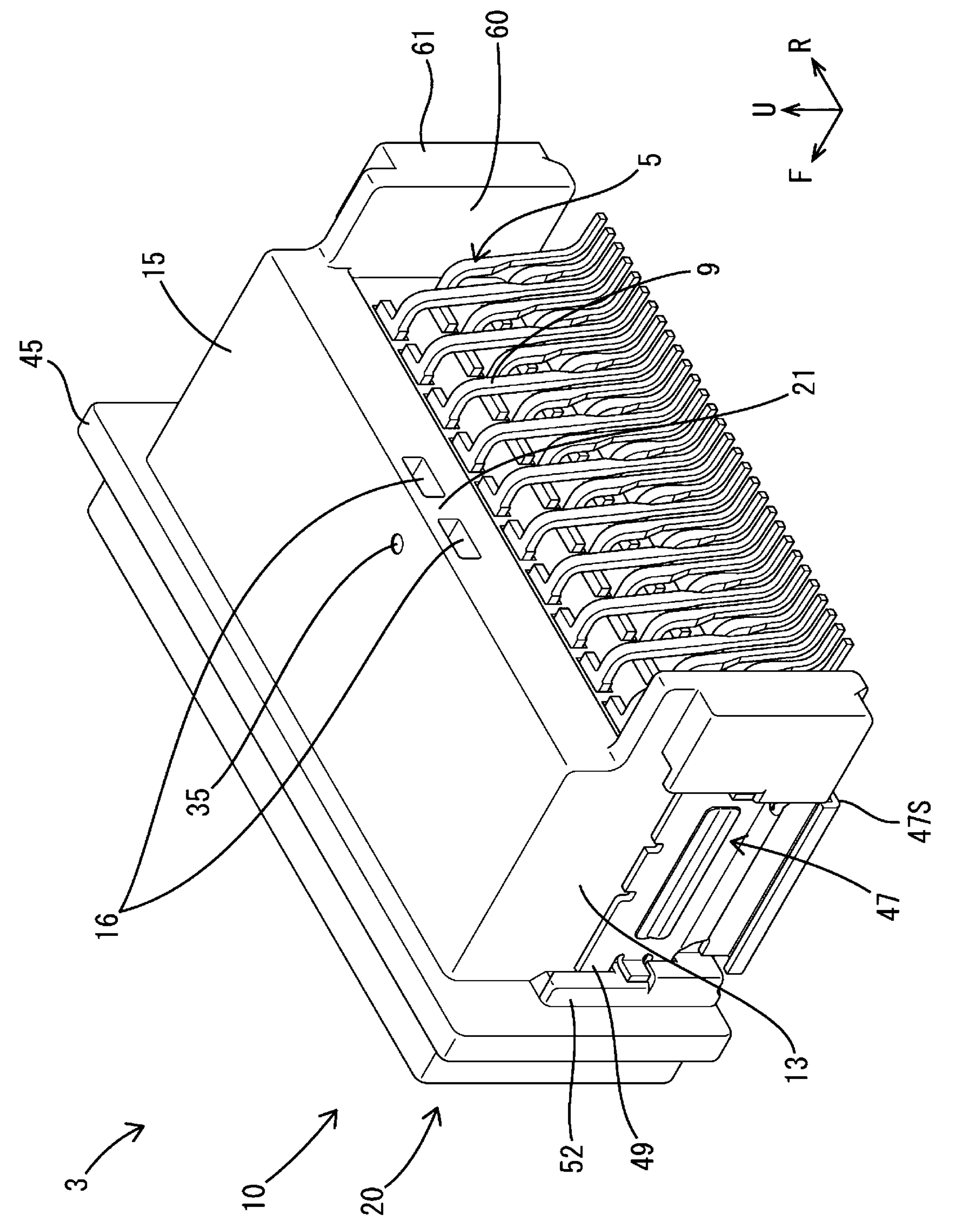
FIG. 1 is a perspective view of a connector according to a first embodiment of the present disclosure.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

EMBODIMENTS OF THE INVENTION

First, embodiments of the present disclosure will be listed and described.

(1) A connector according to the present disclosure includes: a terminal fitting and a resin housing to which the terminal fitting is attached, the housing having a tubular shape that is open forward, and including a bottom wall to be placed on a circuit substrate, a ceiling wall opposing the bottom wall, and a back wall linking a rear end portion of the bottom wall to a rear end portion of the ceiling wall in an up-down direction, the terminal fitting being shaped so as to pass through the back wall in a front-rear direction, and including a terminal connection portion disposed inside the housing, and a substrate connection portion disposed outside the housing, the ceiling wall having a larger volume than the bottom wall and being overall thicker than the bottom wall in the up-down direction, and a terminal protruding surface, from which the substrate connection portion protrudes, on a rear surface of the back wall being disposed forward of a rear surface of the ceiling wall.

In the connector that has the above configuration, the ceiling wall has a larger volume (amount of resin) than the bottom wall and is overall thicker than the bottom wall, and thus, a structure can be realized in which the housing is unlikely to become warped in a high-temperature environment in reflow or the like. In particular, by increasing the volume on the rear surface side of the ceiling wall, it is possible to effectively suppress warping of the housing. In addition, the terminal protruding surface on the back wall is disposed forward of the rear surface of the ceiling wall, and thus the position at which the substrate connection portion is connected to the circuit substrate does not need to be moved rearward in correspondence with the rear surface of the ceiling wall, and it is possible to suppress the amount of area that the connector occupies on the circuit substrate.

(2) In the connector according to the above (1), preferably, a step surface extending in a left-right direction is formed between the terminal protruding surface of the back wall and a region on a rear surface side of the ceiling wall. With the connector that has the above configuration, warping of the housing can be more effectively suppressed by the step surface.

(3) In the connector according to the above (1) or (2), the housing includes a flange portion that protrudes outward from an outer surface of the ceiling wall.

With the connector that has the above configuration, warping of the housing can be more effectively suppressed by the flange portion. The flange portion can be used as a structure for attachment to a case or the like.

(4) In the connector according to any one of the above (1) to (3), preferably, the ceiling wall includes a plurality of lock portions for holding, in a mated state, a partner housing disposed inside the housing, the plurality of lock portions are aligned in the left-right direction and protrude from a front end portion of the ceiling wall, the ceiling wall includes a plurality of punch holes disposed at positions respectively opposing the plurality of lock portions, and a partition wall separating the plurality of punch holes, and the partition wall extends in the front-rear direction while being continuous with the ceiling wall, and has a front end portion connected to the plurality of lock portions. With the connector that has the above configuration, warping of the housing can be more effectively suppressed by the partition wall.

(5) In the connector according to any one of the above (1) to (4), preferably, a gate mark corresponding to an injection port for injecting a molding resin is formed in at least one of a ceiling surface of the rear end portion of the ceiling wall and a bottom surface of the rear end portion of the bottom wall. According to the above configuration, the orientation of a resin (fiber orientation) that forms the housing can be set to the up-down direction, and thus the housing is unlikely to deform upward in a high-temperature environment in reflow or the like, and it is possible to appropriately maintain a state where the substrate connection portion of the terminal fitting is connected to the circuit substrate. The occurrence of warping of the housing due to anisotropic shrinkage can be suppressed by a structure in which the ceiling wall is thicker, and the like.

DETAILS OF EMBODIMENTS OF THE PRESENT DISCLOSURE

Specific examples of the present disclosure will be described below with reference to the drawings. It should be noted that the present invention is not limited to these examples, but is indicated by the claims, and all changes that come within the meaning and range of equivalency of the claims are intended to be embraced therein.

First Embodiment

A connector 3 according to a first embodiment of the present disclosure includes a plurality of terminal fittings 5 and a housing 10 to which the terminal fittings 5 are attached. The connector 3 is a substrate connector that is to be mounted on a circuit substrate 90. The housing 10 can be fitted to a partner housing 50. Note that, in the following description, regarding a front-rear direction, a side on which a surface of the housing 10 is fitted to the partner housing 50 is defined as a front side. The left side in FIG. 3 is the front side. An up-down direction is based on the up-down direction in FIGS. 1 to 5. A left-right direction is based on the left-right direction in FIG. 2.

The "front side" is denoted by "F" in FIGS. 1 and 3 to 6, an "upper side" is denoted by "U" in FIGS. 1 to 5 and 7, and a "right side" is denoted by "R" in FIGS. 1, 2, 6, and 7. The up-down direction does not necessarily match the gravity direction in a state where the connector 3 is mounted in a vehicle or the like (not illustrated).

Figure 3:
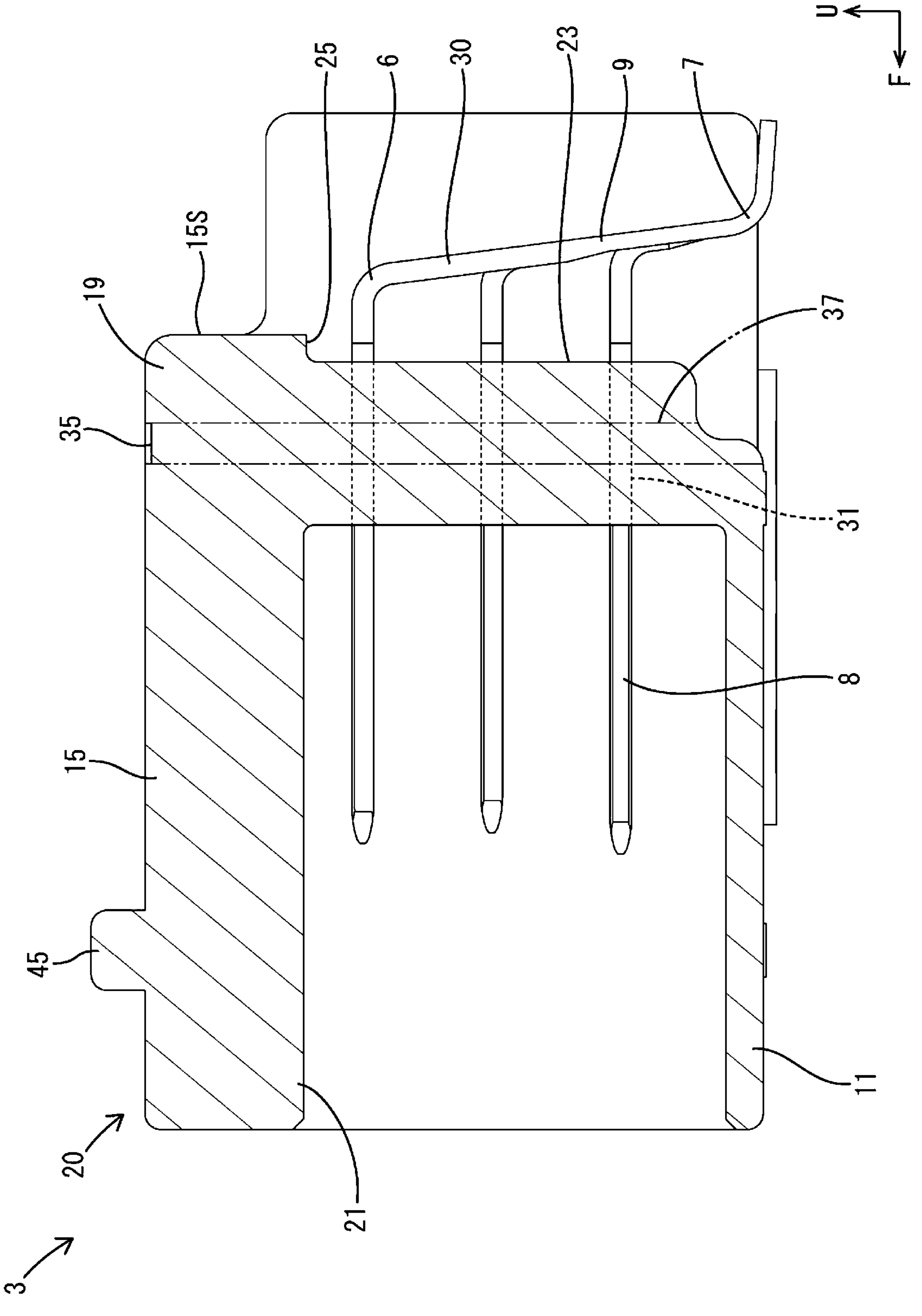
FIG. 3 is a cross-sectional view taken along the line A-A in FIG. 2.
Figure 4:
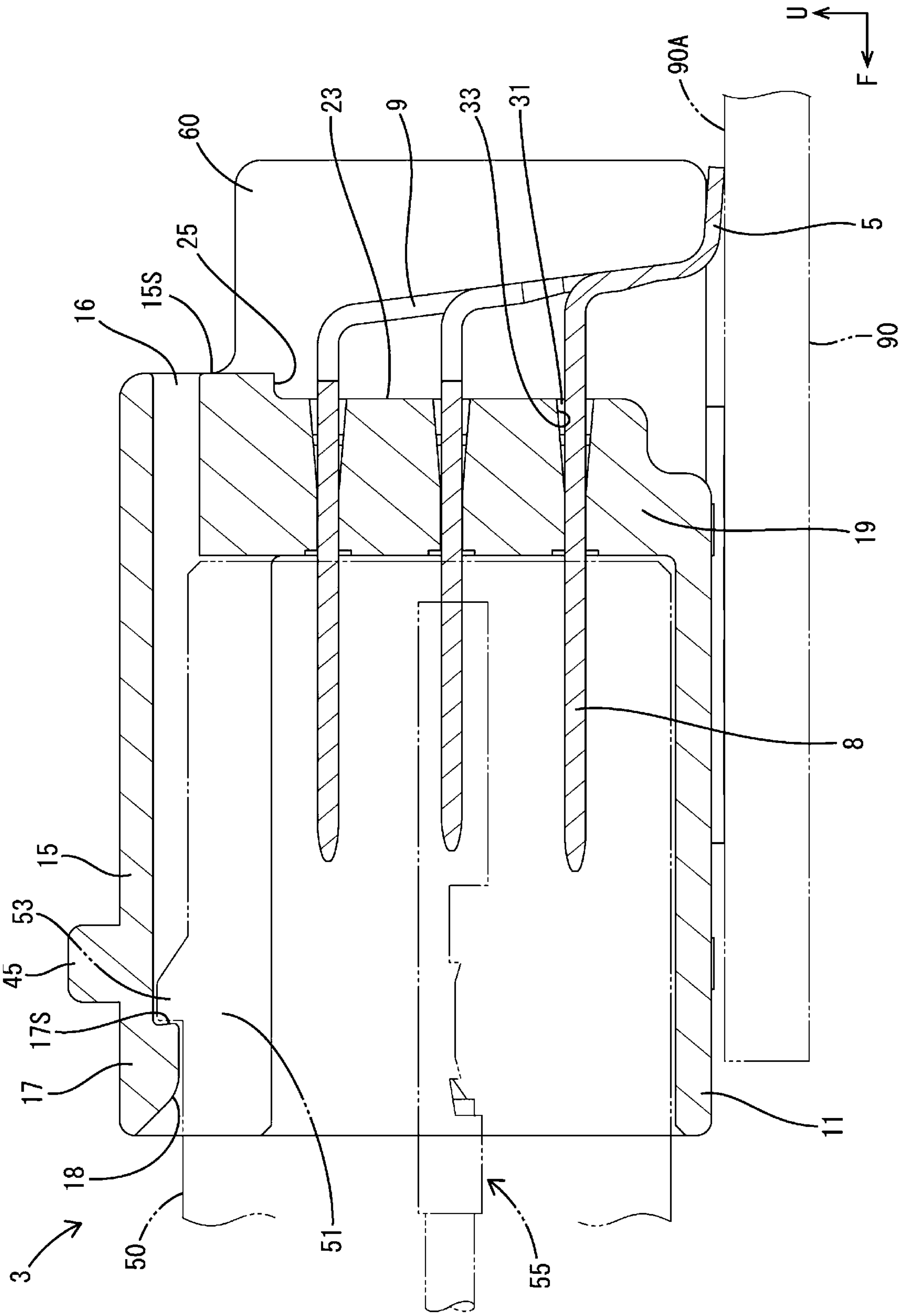
FIG. 4 is a cross-sectional view taken along the line B-B in FIG. 2.

The housing 10 will be described. As shown in FIGS. 1, 3, and 4, the housing 10 is made of a synthetic resin. In the first embodiment, the housing 10 is formed by an anisotropic material such as a liquid crystal polymer (LCP). The housing 10 includes a hood portion 20 that is shaped as a flattened rectangular tube elongated in the left-right direction. As shown in FIG. 4, the partner housing 50 can be fitted to the hood portion 20.

The hood portion 20 includes a bottom wall 11 shaped as a flat plate. The lower surface of the bottom wall 11 is a bottom surface that is placed on the circuit substrate 90. The hood portion 20 includes a pair of plate-shaped side walls 13 that rise from right and left end portions of the bottom wall 11. The hood portion 20 includes a plate-shaped ceiling wall 15 that opposes the bottom wall 11 in parallel therewith above the bottom wall 11. The upper surface of the ceiling wall 15 is a flat ceiling surface spreading along the left-right direction and the front-rear direction.

The hood portion 20 includes a back wall 19 that links a rear end portion of the bottom wall 11 to a rear end portion of the ceiling wall 15 in the up-down direction. Note that, in the present specification, a "rear end portion" refers to an end portion on the rear side, and conceptually includes a portion positioned forward of the rearmost face of the hood portion 20. The back wall 19 is a vertical wall that has a thickness in the front-rear direction. The rear surface of the hood portion 20 is closed by the back wall 19. The hood portion 20 is open on the front side relative to the back wall 19. The lower edges of the pair of side walls 13 are perpendicularly linked to the right and left end portions of the bottom wall 11. The upper edges of the pair of side walls 13 are perpendicularly linked to right and left end portions of the ceiling wall 15. The rear end edges of the pair of side walls 13 are perpendicularly linked to right and left end portions of the back wall 19.

Figure 2:
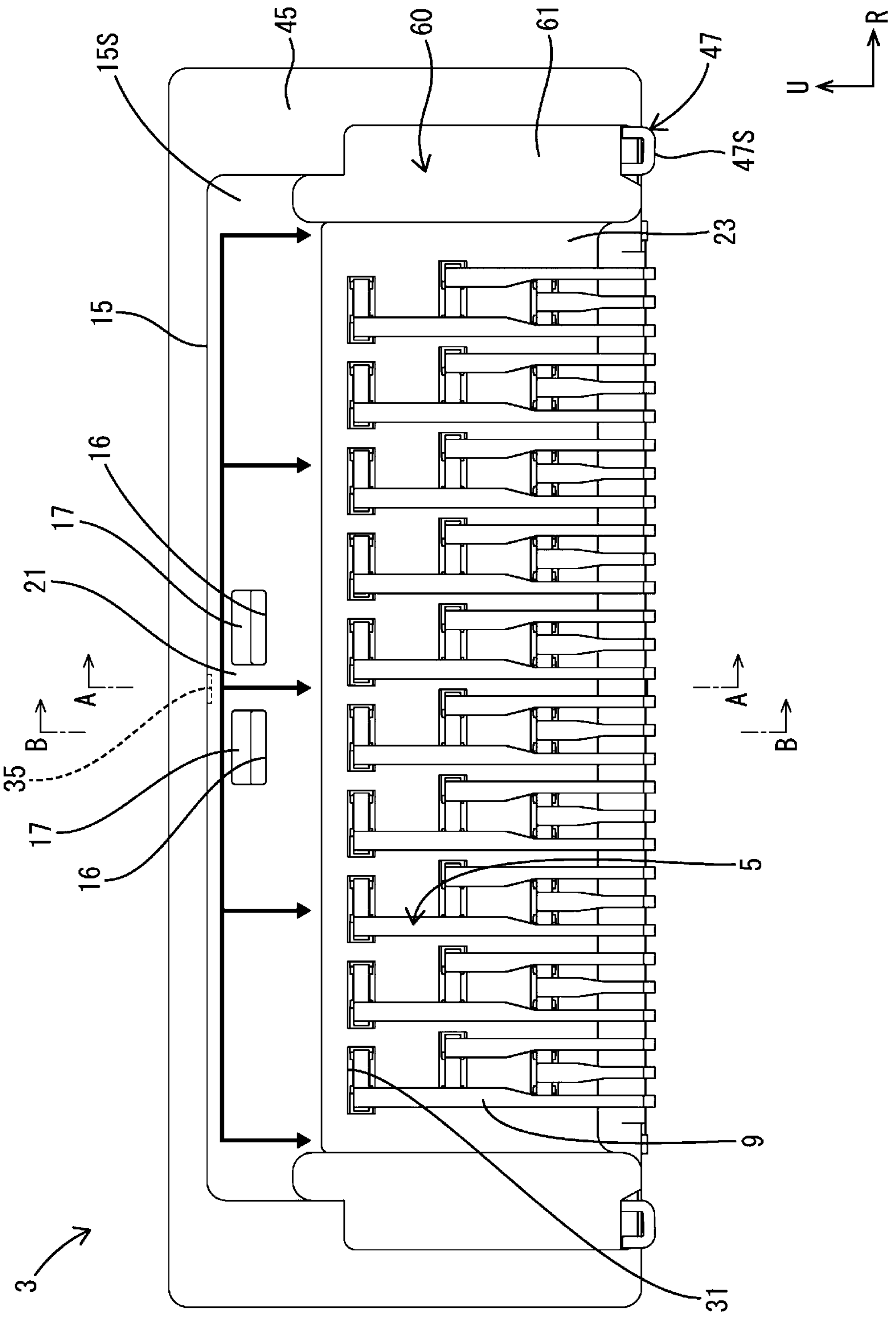
FIG. 2 is a rear view of the connector.

As shown in FIGS. 2 and 4, the hood portion 20 has, on the ceiling wall 15 thereof, a pair of claw-shaped lock portions 17 that protrude inward in the hood portion 20. The lock portions 17 are arranged symmetrically as a pair, on opposite sides of a central portion in the left-right direction of the ceiling wall 15 (a partition wall 21 to be described later). The lock portions 17 each include an inclined surface 18 extending obliquely downward from a front end of the ceiling wall 15 to the inner side. Rear surfaces of the lock portions 17 are engagement surfaces 17S that intersect the inner lower surface of the ceiling wall 15 (downward facing surface of the ceiling wall 15) at right angle or acute angle.

The ceiling wall 15 includes punch holes 16 that are open rearward, in a rear end portion of the ceiling wall 15 that opposes the engagement surfaces 17S. The punch holes 16 are arranged as a pair in the left-right direction in correspondence with the lock portions 17. The punch holes 16 have a quadrangular shape as viewed from the rear side, and are formed as a result of pulling away a metal mold (not illustrated) for molding the engagement surface 17S. An upper end portion of the back wall 19 faces the punch holes 16.

The ceiling wall 15 includes, in a central portion in the left-right direction of the rear end portion thereof, the pair of right and left punch holes 16 that are separated from each other by the partition wall 21. The partition wall 21 extends forward from the rear end portion at a position between the punch holes 16 while being continuous with the inner lower surface of the ceiling wall 15. A front end portion of the partition wall 21 is a portion of the opening end portion of the hood portion 20, and right and left end portions of the front end portion of the partition wall 21 are connected to the corresponding lock portions 17.

A rear surface 15S of the ceiling wall 15 extends along the up-down direction and the left-right direction. The punch holes 16 are open in the rear surface 15S of the ceiling wall 15. A rear surface of the partition wall 21 is a portion of the rear surface 15S of the ceiling wall 15. The back wall 19 has a terminal protruding surface 23 on a rear surface thereof. The terminal fittings 5 protrude from the terminal protruding surface 23 to the outside of the housing 10. The terminal protruding surface 23 is disposed so as to be recessed forward relative to the rear surface 15S of the ceiling wall 15. A step surface 25 facing downward and extending in the left-right direction is formed between the terminal protruding surface 23 of the back wall 19 and the rear surface 15S of the ceiling wall 15.

The back wall 19 includes a plurality of terminal accommodation holes 31 that pass therethrough in the front-rear direction, in order to insert the terminal fittings 5. The terminal accommodation holes 31 are aligned in a plurality of rows in the up-down direction and in a plurality of columns in the left-right direction, and are open in the terminal protruding surface 23. As shown in FIG. 4, the terminal accommodation holes 31 each include a tapered portion 33 inclined such that the opening diameter thereof decreases while extending forward from the terminal protruding surface 23.

The housing 10 includes a gate mark 35 in a central portion in the left-right direction of the upper surface in the rear end portion of the ceiling wall 15. The gate mark 35 is shaped as a circular recess, and is formed at a position corresponding to an injection port for injecting a resin (molten resin) for forming the housing 10. The diameter of the gate mark 35 is smaller than the width in the left-right direction of the partition wall 21. The housing 10 includes a continuous resin portion 37 extending in a continuous manner downward from the gate mark 35. The continuous resin portion 37 is a resin portion that passes (vertically) through the ceiling wall 15, the back wall 19, and the bottom wall 11 in the up-down direction. An upper surface of the continuous resin portion 37 constitutes the gate mark 35, at the upper surface of the ceiling wall 15. The continuous resin portion 37 has a circular cross-sectional shape corresponding to the gate mark 35, and is continuous with the portion of the housing 10 that surrounds the continuous resin portion 37 without a boundary. The continuous resin portion 37 forms a portion of the partition wall 21 on the ceiling wall 15. The continuous resin portion 37 forms a resin portion of the back wall 19 between the terminal accommodation holes 31. A lower surface of the continuous resin portion 37 forms a portion of the lower surface of the bottom wall 11.

Figure 7:
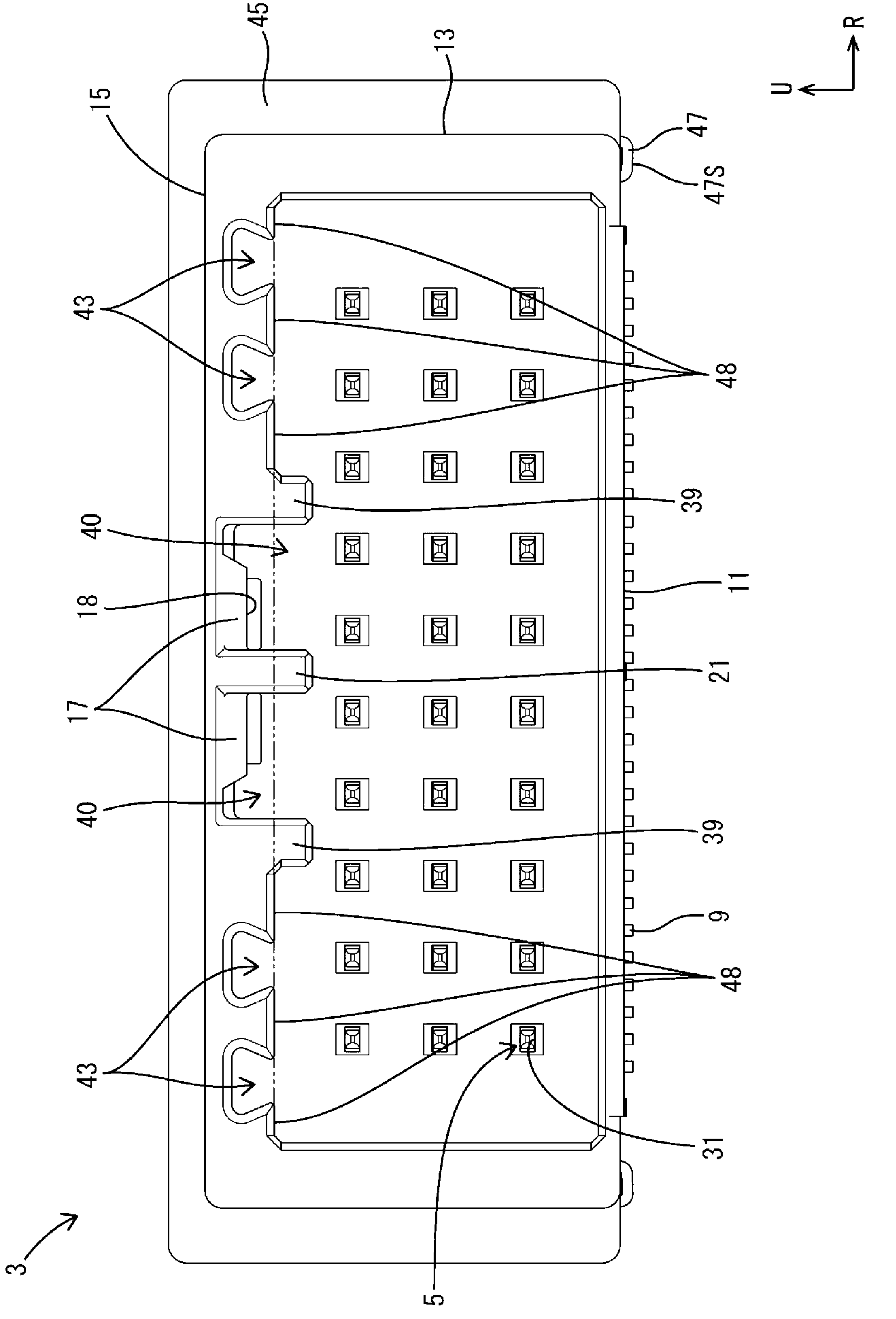
FIG. 7 is a front view of the connector.

As shown in FIG. 7, the ceiling wall 15 includes a reference wall 48 extending in the left-right direction. A lower surface of the reference wall 48 (reference surface facing the inner side of the hood portion 20) is a surface defined by a height position that includes the dashed line in FIG. 7. The lock portions 17 are formed within the thickness in the up-down direction of the reference wall 48. The thickness in the up-down direction of the reference wall 48 is larger than the thickness in the up-down direction of the bottom wall 11, and is larger than the thickness in the left-right direction of the side walls 13 (excluding attachment portions 52 of fixing members 47 to be described later). The ceiling wall 15 that includes the reference wall 48 has a larger volume (the amount of resin) than the bottom wall 11 and is overall thicker than the bottom wall 11 in the up-down direction.

The partition wall 21 includes a portion that protrudes downward from a central portion in the left-right direction of the reference wall 48. The ceiling wall 15 includes a pair of right and left protruding ribs 39 that protrude downward from the lower surface of the reference wall 48, on opposite sides of the lock portions 17. The protruding ribs 39 extend rearward from the front surface of the ceiling wall 15 in parallel with the partition wall 21, and have rear ends that are connected to the back wall 19. The ceiling wall 15 includes, between the protruding ribs 39, first recessed portions 40 into which lock arms 51 of the partner housing 50 to be described later move forward.

The ceiling wall 15 includes left and right pairs of second recessed portions 43 that are recessed from the lower surface of the reference wall 48, at portions that are respectively closer to left and right end portions of the ceiling wall 15, each pair being disposed between the protruding rib 39 and the side wall 13. The second recessed portions 43 extend in the front-rear direction, front ends thereof are open at the front surface of the ceiling wall 15, and rear ends thereof are closed by the rear end portion of the ceiling wall 15. Each of the second recessed portions 43 is dovetail-shaped with a width in the left-right direction that increases toward the upper side. Ribs (not illustrated) of the partner housing 50 are fitted to the second recessed portions 43.

As shown in FIG. 1, the housing 10 includes a flange portion 45 that protrudes from the ceiling wall 15 and the outer surfaces of the side walls 13, on the outer peripheral portion that is close to a front end of the hood portion 20. The protruding length of the flange portion 45 from the side walls 13 is larger than the protruding length from the ceiling wall 15. The flange portion 45 is shaped as a plate, and the plate surfaces thereof face the front and the rear. The attachment portions 52 that include grooves (not illustrated) for fixing the later-described fixing members 47 are integrally provided on rear end surfaces of right and left end portions of the flange portion 45. The flange portion 45 is for attachment to a case (not illustrated).

Figure 5:
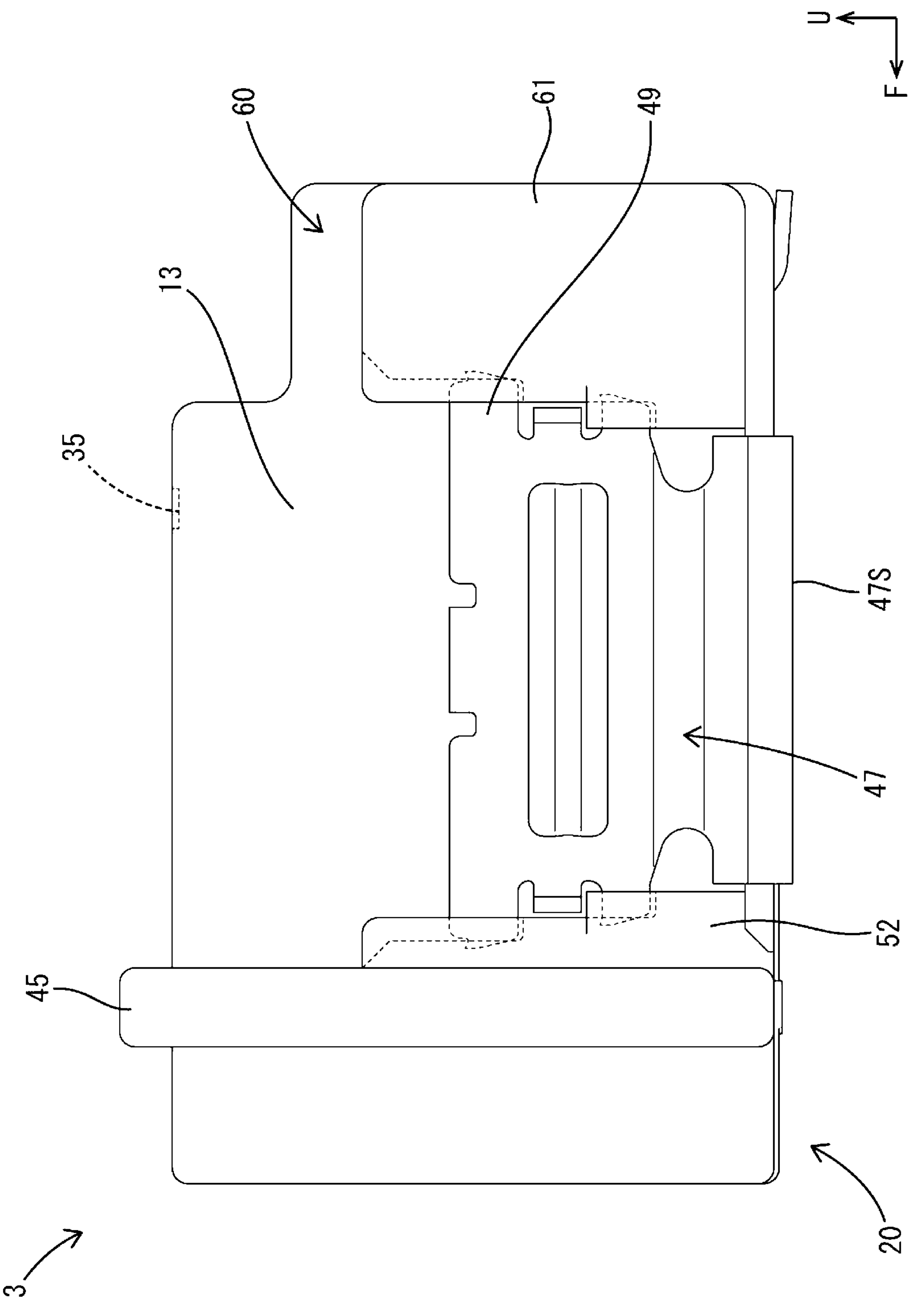
FIG. 5 is a side view of the connector.
Figure 6:
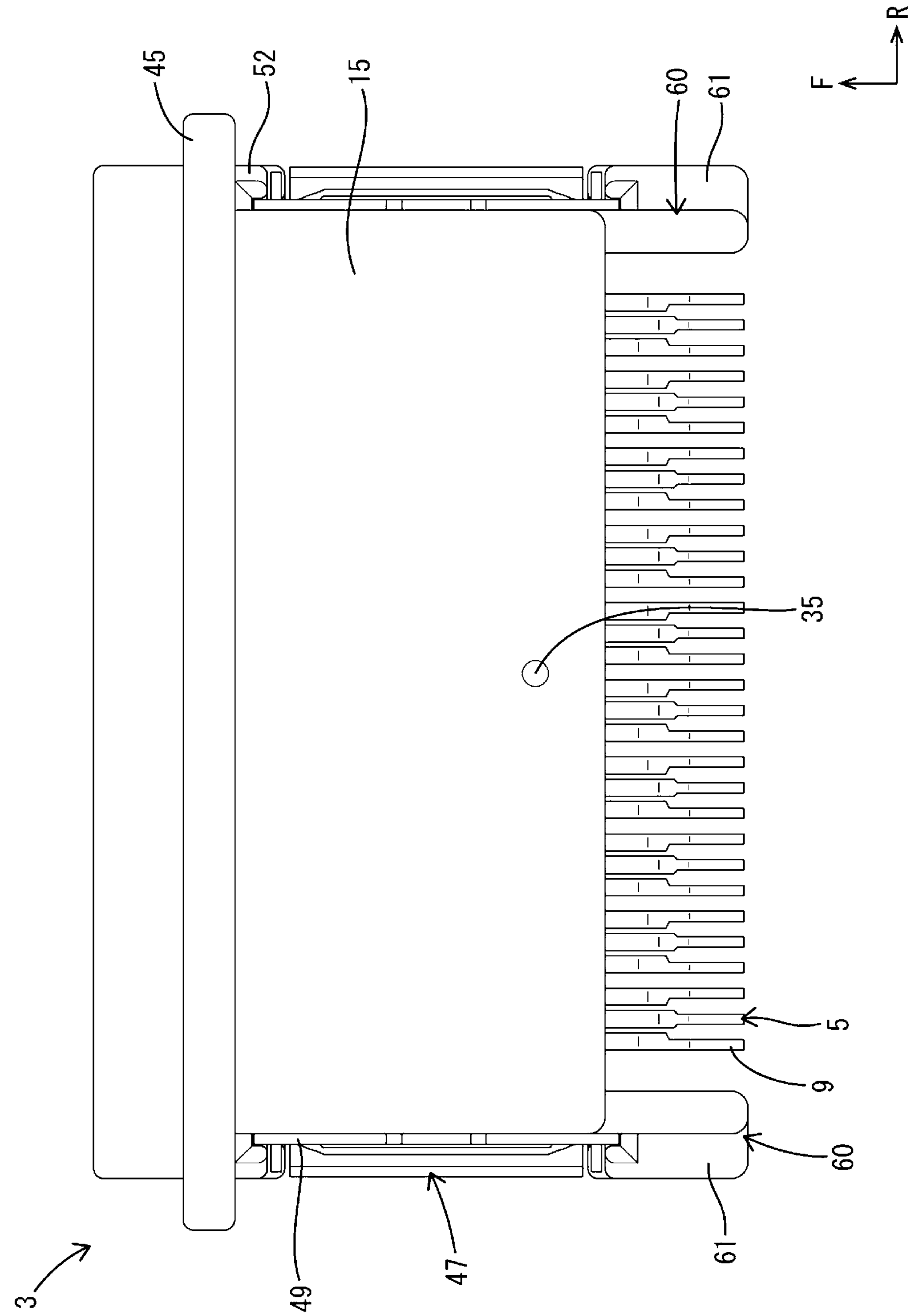
FIG. 6 is a plan view of the connector.

The housing 10 includes a pair of right and left protection walls 60 that protrude in a continuous manner rearward respectively from the side walls 13. The protection walls 60 are shaped as a plate, and are each disposed with the plate surfaces thereof being directed to the right and the left. The protection walls 60 protect the terminal fittings 5 on the right and left sides thereof. The protection walls 60 each include a thick portion 61 having a larger width in the left-right direction. As shown in FIG. 5, a groove portion (not illustrated) for attaching a later-described fixing member 47 is formed on the thick portion 61.

A pair of fixing members 47 made of metal are respectively attached to the outer surfaces of the two side walls 13 of the hood portion 20 (right and left end surfaces of the hood portion 20). Bottom surfaces 47S of the fixing members are fixed to the circuit substrate 90 through soldering. The fixing members 47 respectively include a pair of engagement portions 49 that protrude in the front-rear direction. As shown in FIG. 5, the engagement portions 49 are attached and fixed to the thick portions 61 of the protection walls 60 and attachment portions 52.

The terminal fittings 5 are made of metal, and, as shown in FIG. 3, each of the terminal fittings 5 includes a terminal connection portion 8 that extends in the front-back direction and passes through the terminal accommodation hole 31 in a press-fit state. The terminal connection portion 8 includes a portion that protrudes to the inner side of the hood portion 20 and is connected to a partner terminal 55. The terminal connection portion 8 includes a portion protruding rearward from the terminal protruding surface 23. Each terminal fitting 5 includes a substrate connection portion 9 that is continuous with a rear end of the terminal connection portion 8 via a first curved portion 6, and extends downward from the first curved portion 6. The substrate connection portion 9 includes, on a lower end portion thereof, a portion that extends rearward via a second curved portion 7, and is connected to the circuit substrate 90 through soldering.

As shown in FIG. 4, the lock portions 17 of the housing 10 and partner lock portions 53 of the partner housing 50 are engaged with each other, and thus the housing 10 and the partner housing 50 are held in a mated state, and the terminal connection portions 8 are connected to the partner terminals 55 attached to the partner housing 50. The rear ends of the substrate connection portions 9 of the terminal fittings 5 are connected to a mount surface 90A of the circuit substrate 90 through soldering.

Next, actions of the connector 3 according to the first embodiment will be described. A metal mold (not illustrated) is filled with a molten resin, which is solidified, and the metal mold is then opened to take out the housing 10. On the upper surface of the rear end portion of the ceiling wall 15 of the formed housing 10, the gate mark 35 is formed in correspondence with a position at which the molten resin was injected into the metal mold. The resin orientation (fiber orientation) of the housing 10 corresponds to the direction in which the molten resin flows, and the resin orientation of the housing 10 is set to the direction in which the continuous resin portion 37 extending downward from the gate mark 35 is formed and the up-down direction that is parallel to the continuous resin portion 37 (see the arrow direction in FIG. 2). For this reason, the housing 10 is unlikely to thermally deform in the up-down direction.

Note that, in the first embodiment, the housing 10 includes the continuous resin portion 37 extending in a continuous manner from the gate mark 35, and thus the resin orientation can be appropriately set to the up-down direction without blocking the flow of the molten resin.

The connector 3 is mounted on the circuit substrate 90 through reflow. Specifically, the substrate connection portions 9 of the terminal fittings 5 and the fixing members 47 are placed on soldering paste formed on the surface of the circuit substrate 90, and the solder is melted in a reflow furnace (not illustrated). After that, by undergoing cool-solidification, the fixing members 47 are fixed to the circuit substrate 90 through soldering, and the substrate connection portions 9 of the terminal fittings 5 are connected to the conductive portion of the circuit substrate 90 through soldering.

In general, there is a concern that the housing will thermally expand and deform upward away from the circuit substrate 90, by being heated in a reflow furnace. However, in the first embodiment, as described above, the resin orientation of the housing 10 is set to the up-down direction, and thus, even in a high-temperature environment such as the inside of a reflow furnace, it is possible to suppress deformation of the housing 10 in the up-down direction.

In addition, in general, there is a concern that, when the housing 10 is heated in a reflow furnace, a central portion in the left-right direction of the housing 10 will deform so as to curve upward. If the housing is warped in this manner, the terminal fittings 5 become displaced upward, and, in particular, there is also a risk that the substrate connection portions 9 of the terminal fittings 5 on the upper side separate from the conductive portions of the circuit substrate 90, resulting in a connection failure. However, in the first embodiment, as described above, the ceiling wall 15 is overall thicker than the bottom wall 11 in the up-down direction, and has a larger volume than the bottom wall 11. For this reason, an upper end portion of the housing 10 is unlikely to deform in the left-right direction, and warping of the housing 10 can be suppressed. In addition, after reflow, even in a state where the connector 3 is mounted in a vehicle or the like, warping of the housing 10 can be suppressed due to the structure of the ceiling wall 15 being thick. In particular, the step surface 25 extending in the left-right direction is formed between a rear surface of the ceiling wall 15 and the terminal protruding surface 23, and thus warping of the housing 10 can be effectively suppressed.

The flange portion 45 is disposed so as to protrude from the ceiling wall 15 and the outer surfaces of the side walls 13, thereby reinforcing the ceiling wall 15 and the side walls 13 from the outside. Warping of the housing 10 can be more reliably suppressed due to the flange portion 45. In addition, the partition wall 21 extends in the front-rear direction, and a front end portion thereof is connected to each of the lock portions 17, and thus a structure is realized in which the ceiling wall 15 is more unlikely to deform.

The terminal protruding surface 23 is disposed on the front side relative to the rear surface of the ceiling wall 15, and thus the ceiling wall 15 is thick in the front-rear direction. Accordingly, it is also possible to suppress warping of the housing 10 in the front-rear direction. In addition, with this configuration, positions at which the terminal connection portions 8 of the terminal fittings 5 protrude from the terminal protruding surface 23 are also provided on the front side relative to the rear surface of the ceiling wall 15 due to formation of the step surface 25. For this reason, the size in the front-rear direction of the terminal connection portions 8 of the terminal fittings 5 does not need to be unnecessarily large. As a result, there is a shorter distance between the front end of the hood portion 20 and the position at which the substrate connection portions 9 are connected to conductive portions of the circuit substrate 90. That is to say, it is possible to prevent an excessive increase in the distance between the front end position of the connector 3 and the above connection positions in the circuit substrate 90.

Other Embodiment of Present Disclosure

The above first embodiment disclosed here is exemplary in all respects and should not be interpreted as limiting in any manner.

(1) In the above first embodiment, the gate mark is provided in the upper surface (ceiling surface) of the rear end portion of the ceiling wall. In contrast, according to another embodiment, the gate mark may be provided in a lower surface (bottom surface) of a rear end portion of the bottom wall. In addition, gate marks may be formed in right and left end portions of at least one of an upper surface and a lower surface of a rear end portion of the ceiling wall.

(2) The partition wall does not need to be connected to the lock portions. A configuration may also be adopted in which, for example, a front end surface of the partition wall is disposed on the rear side relative to rear end surfaces of the lock portions.

(3) A plurality of gate marks may be formed in either an upper surface or a lower surface of a rear end portion of the ceiling wall.

(4) The continuous resin portion is a resin portion that passes (vertically) through the ceiling wall 15, the back wall 19, and the bottom wall 11 in the up-down direction. The region in which the continuous resin portion is formed is not limited to a columnar shape with a gate mark disposed at an upper surface.

Prom the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector comprising:

a terminal fitting; and a resin housing to which the terminal fitting is attached, wherein the resin housing has a tubular shape that is open forward, and includes a bottom wall to be placed on a circuit substrate, a ceiling wall opposing the bottom wall, and a back wall integrally linking a rear end portion of the bottom wall to a rear end portion of the ceiling wall in an up-down direction, the terminal fitting is shaped so as to pass through the back wall in a front-rear direction, and includes a terminal connection portion disposed inside the resin housing, and a substrate connection portion disposed outside the resin housing, the ceiling wall has a larger volume than the bottom wall and is overall thicker than the bottom wall in the up-down direction, the back wall includes a thick portion connected to the rear end portion of the ceiling wall and a thin portion having a thickness less than a thickness of the thick portion, and a terminal protruding surface, from which the substrate connection portion protrudes, is formed on a rear surface of the thin portion of the back wall and is disposed forward of a rear surface of the ceiling wall.

2. The connector according to claim 1, wherein a step surface extending in a left-right direction is formed between the terminal protruding surface of the back wall and a region on a rear surface side of the ceiling wall.

3. The connector according to claim 1, wherein the resin housing includes a flange portion that protrudes outward from an outer surface of the ceiling wall.

4. The connector according to claim 1, wherein the ceiling wall includes a plurality of lock portions for holding, in a mated state, a partner housing disposed inside the resin housing, the plurality of lock portions are aligned in the left-right direction and protrude from a front end portion of the ceiling wall, the ceiling wall includes a plurality of punch holes disposed at positions respectively opposing the plurality of lock portions, and a partition wall separating the plurality of punch holes, and the partition wall extends in the front-rear direction while being continuous with the ceiling wall, and has a front end portion connected to the plurality of lock portions.

5. The connector according to claim 4, wherein a gate mark corresponding to an injection port for injecting a molding resin is formed in at least one of a ceiling surface of the rear end portion of the ceiling wall and a bottom surface of the rear end portion of the bottom wall.

6. The connector according to claim 1, wherein the thick portion of the back wall is formed to be continuous with the rear end portion of the ceiling wall, and the thin portion is formed below the thick portion and is continuous with the rear end portion of the bottom wall.

7. The connector according to claim 1, wherein the terminal protruding surface is a vertical surface substantially perpendicular to a front-rear direction, and is positioned between a rear end of the ceiling wall and a rear end of the bottom wall in the front-rear direction.

8. The connector according to claim 1, wherein the resin housing is a single unitary molded body, and a boundary between the ceiling wall and the thick portion of the back wall has a larger thickness than a boundary between the bottom wall and the thin portion of the back wall.

* * * * *